United States Patent [19]
Caine

[11] 3,950,098
[45] Apr. 13, 1976

[54] SAFE DISTANCE VISUAL WARNING DEVICE

[76] Inventor: Harold A. Caine, 484 Kent Court, Oceanside, N.Y. 11572

[22] Filed: Apr. 24, 1974

[21] Appl. No.: 463,576

Related U.S. Application Data

[63] Continuation-in-part of Ser. No. 420,952, Dec. 3, 1973, Pat. No. 3,868,629.

[52] U.S. Cl.................... 356/3; 40/129 C; 350/97
[51] Int. Cl.².................... G01C 3/00; G02B 5/12
[58] Field of Search........ 356/3, 15, 20, 21; 351/17, 351/18; 40/125 M, 129 C

[56] References Cited
UNITED STATES PATENTS

| | | | |
|---|---|---|---|
| 3,419,985 | 1/1969 | Berrier | 40/129 C |
| 3,521,391 | 7/1970 | Murai | 40/129 |

*Primary Examiner*—John K. Corbin
*Assistant Examiner*—Richard A. Rosenberger
*Attorney, Agent, or Firm*—Samson Helfgott

[57] ABSTRACT

The invention describes a vehicle safety device which gives a visual indication to a driver of one vehicle when the distance between his vehicle and another vehicle is safe, unsafe, or where caution must be used for the speed at which he is driving. The device utilizes a plurality of different sized warning areas, each of which is assigned to a particular speed at which a warning is to be provided. The size of the area is larger for faster speeds and is smaller for slower speeds. In a first embodiment, the areas are illuminated windows which are assigned to particular speeds. If a particular window can be seen then at the assigned speed, the distance is too close. At a safe distance the window will merge with the windows assigned to slower speeds. In a second embodiment, the warning areas are darkened areas and for a particular speed, if the corresponding dark area can be seen, the distance is too close. At a safe distance, the darkened area will tend to disappear into the background. In a third embodiment, the warning areas represent different colors, and for a particular speed, if the corresponding colored area is visible, the distance at that speed is too close. When the colored area disappears, the distance is safe at that speed. In each embodiment if the area assigned to the particular speed can not be seen at that speed, the distance is safe. However, if the shape, color or design of the area is not clearly discernable then the driver should exercise caution. The driver can then determine whether he should reduce his speed and fall back; whether he can safely increase his speed and change lanes, or other such maneuvers to improve his degree of safety.

17 Claims, 14 Drawing Figures

SAFE DISTANCE VISUAL WARNING DEVICE

This invention is a continuation-in-part of co-pending Ser. application No. 420,952 bearing the title VISUAL COLLISION AVOIDANCE WARNING DEVICE and filed on Dec. 3, 1973, now U.S. Pat. No. 3,868,629, issued Feb. 25, 1975.

This invention relates to a visual safety device which provides a visual indication to a driver when he is at a safe distance from another vehicle and also provides an indication of an unsafe distance, as well as providing an indication when caution is needed with respect to the spacing between his vehicle and other vehicles, either in front or behind, for the speed at which he is driving.

BACKGROUND OF THE INVENTION

About ninety percent of all automobile accidents are utlimately caused by the driver's actions himself. Furthermore, about forty percent of known auto accidents are rear-end collisions. The determination of the proper following distance behind another vehicle is therefore a critical factor in minimizing such accidents. There are many suggestions as to the appropriate stopping distance for a given speed. The "rule of thumb" of leaving one car length for every ten miles of speed has long been proven inadequate. The proper stopping distance is much greater for faster speeds and additional safety factors must be added for diverse road and weather conditions. It therefore becomes a difficult problem to know whether at a given speed there is sufficient distance between your vehicle and another vehicle. The determination of the proper distance is an ever changing requirement of normal driving.

In the aforementioned parent application there is described a vehicle safety device which gives a visual indication to a driver of one vehicle concerning the safety of the distance between his vehicle and another vehicle based upon the speed at which he is driving. The device therein described includes a housing having an illumination source and a screen impervious to light. The screen contains a plurality of pairs of windows. The windows constituting a pair are separated from each other by a spacing which depends upon the resolving power of the eye. For a predetermined speed, the windows constituting a particular pair are separated such that at distances between the vehicles, up to a predetermined minimum safe stopping distance, the windows constituting that pair are seen as two windows indicating an unsafe condition; for distances between the vehicles which are greater than the minimum stopping distance by a fixed amount, the two windows appear as one, indicating a safe condition; and for distances therebetween, a hazy condition appears which then indicates that caution must be exercised at that speed for the distance between the vehicles.

The warning device of the aforementioned patent application is based upon the optical phenomena that two illuminated objects spaced from each other will tend to merge as the viewer moves away from the two illuminated objects. A number of embodiments of this concept were presented in the aforementioned parent application. The present application provides a variation on that concept. However, in the present application only a single warning area need be provided for a particular speed. Additionally, the present invention utilizes the optical principle that objects tend to become smaller and disappear as the distance between the viewer and the objects increases. When the distance is reduced, the objects will again reappear.

It is intended that all of the material disclosed in the earlier parent application is herein incorporated by reference.

It is, accordingly, an object of the present invention to provide a visual collision avoidance warning device which gives an easily observable indication of whether a vehicles is at a safe, unsafe, or caution needed distance from another vehicle for the speed at which it is traveling.

It is another object of this invention to supply an auto driver with a visual means of keeping his vehicle in a safety zone in relation to the constantly changing traffic situations surrounding him.

A further object of this invention is to provide a reliable distance-gauging device applicable to all driving conditions.

SUMMARY OF THE INVENTION

Briefly, the invention provides a device for installation in or on a first vehicle which provides a visual indication to the driver of a second vehicle, spaced apart from the first vehicle, when the distance between the two vehicles is safe or unsafe for the speed of the second vehicle, and further provides visual indication of when caution is needed for that distance and that speed.

In a first embodiment the device includes a plurality of different sized illumination areas wherein each one of the illuminated areas is utilized to provide a visual warning for a given speed. In this first embodiment the illuminated area at a particular speed tends to merge into the previously merged illumination areas, as the distance between the vehicles increases. In a second embodiment, a plurality of different sized dark areas are provided wherein each sized dark area represents a different predetermined speed. In this embodiment, the smaller sized dark areas tend to disappear as the distance between the vehicles is increased.

In a third embodiment, different sized colored aeas are provided, each colored area represents a predetermined speed and the smaller areas tend to disappear as the distance between the vehicles is increased.

Utilizing the first embodiment, if the predetermined illuminated area can be seen for the particular speed, then the driver of the vehicle viewing the illuminated area is warned that he is too close for that speed. If on the other hand that particular illuminated area has been merged with the previously merged illumination areas, then the driver of the vehicle knows that he is at a safe distance at that speed. If he cannot clearly discern whether the particular illuminated area for that speed has been merged or has not been merged, he is warned that he is in a dangerous position and caution should be exercised. The driver can then determine whether he should reduce his speed and fall back; whether he can safely increase his speed and change lanes, or other such maneuvers to improve the degree of safety.

In the second and third embodiments, if the darkened area or colored area for a particular speed can be seen, then the driver of the vehicle viewing the particular area is warned that he is too close for that speed. If, on the other hand, the dark or colored area disappears, then the driver knows that he is at a safe distance. If the driver cannot sharply discern whether he can see the particular darkened or colored area or not, based upon the speed at which he is traveling, then he is warned that he is at a distance wherein caution must be exercised. The driver can again determine if he should reduce his speed and fall back; whether he can safely increase his speed and change lanes, or other such maneuvers to improve the degree of safety.

BRIEF DESCRIPTION OF THE DRAWINGS

In the various figures of the drawings, like reference characters designate like parts.

In the drawings.

DESCRIPTION OF THE PREFERRED EMBODIMENTS

Figure 1:
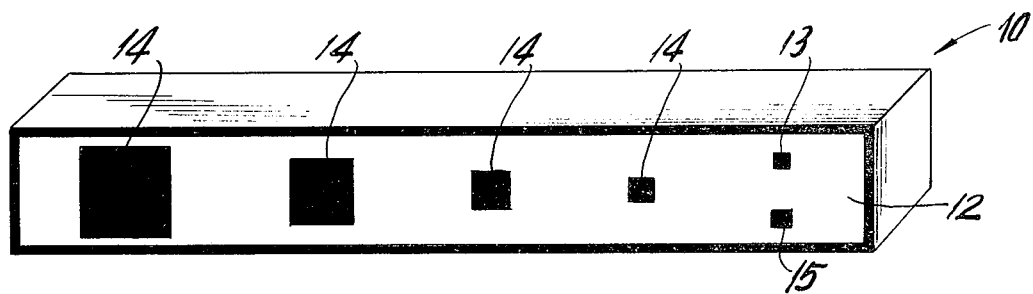
FIG. 1 is a perspective view of one embodiment of the device in accordance with the present invention.

As has been described in the aforementioned parent application, the present invention provides a visual device which can be formed into an independent unit such that it can be mounted on existing vehicles in various positions. For example, it can be mounted on top of the vehicle and in fact can be utilized as a two sided unit and visible to both trailing vehicles and forward vehicles of the vehicle bearing the device of this invention. The device could be mounted on the trunk portion of the vehicle; on the front hood portion of the vehicle; it can be mounted horizontally or vertically, and can be mounted in single or in paired units. Furthermore, it can be incorporated directly onto or within the front and/or rear windshield of existing vehicles. It could also be placed on the front side of the rear view mirror, thereby making it visible to forward vehicles via their own rear view mirrors. Alternately, the present invention can be included within the tail light system or the windshields of either existing vehicles or vehicles which are being manufactured. Thus, by way of example, FIG. 1 shows the device of this invention as it can be included in the separate device having a housing 10 including a screen 12 and a plurality of different sized or shaped warning indications 14. As will hereinafter be explained, the screen can be illuminated and the warning areas 14 can be dark spots. Alternately, the screen 12 can be a dark area and the warning area 14 can be illuminated. Each window could have the same illumination or its own degree of illumination intensity. In either embodiment, a separate illumination means (not shown) would be incorporated within the housing unit 10 and could include its own source of energy such as batteries or alternately could be wired directly to the the battery of the vehicle as the source of energy. Also shown are areas 13 and 15 which represent resepctively, minimum stopping distances for urban and rural areas. Thus, even when a car has stopped, there should be a distance between his car and the previous car. However, in urban areas, such as large cities, it may not always be feasible to leave as much distance as would be desired. Therefore, a separate minimum stopping distance is provided for urban and for rural areas.

Figure 2:
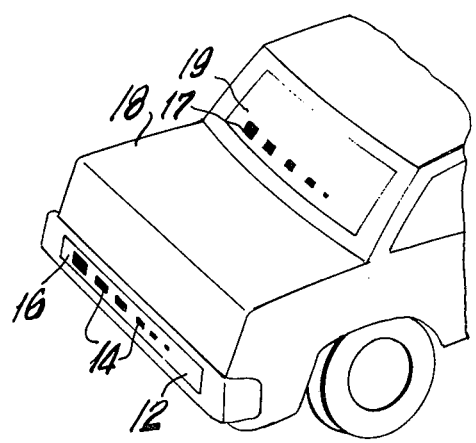
FIG. 2 is a perspective view of the rear of a vehicle employing the system of the present invention as part of the lighting system or part of the rear windshield.

Referring now to FIG. 2, the device of the present invention is shown as being incorporated within the lighting system 16 of an existing vehicle 18, wherein again there is provided a screen 12 having the warning areas 14 located thereon. Again, either the screen or the warning areas would be illuminated while the other would be relatively dark. In this case the illumination could be energized directly from the wiring associated with the vehicle lighting control system or separate wiring and illumination devices could be added.

FIG. 2 shows another possible location of the device of this invention. The different sized areas 17 could be located on the rear windshield 19. The areas 17 could be built directly into the windshield or as part of a housing which is placed onto the windshield as for example by means of an adhesive. The areas 17 could be illuminated windows having separate illumination means for each window or they could be part of a screen with a common illumination means for all areas. Light emitting diodes or other optoelectronic devices could be used as the illumination means. The part of the housing or adhesive facing into the car would be impervious to light so as not to distract the people inside the car. Instead of illuminated windows, the warning areas could also be dark areas with illuminated screens around them. It is understood that the device could also be placed on the front windshield.

Figure 3:
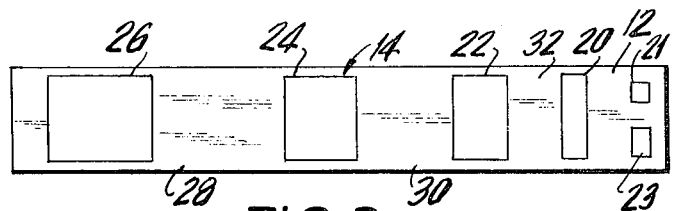
FIG. 3 is a first embodiment of the present invention.

Referring now to FIG. 3 there is shown a first embodiment of the present invention wherein the screen 12 is a light impervious screen and typically made of dark material. The warning areas 14 are illuminated areas. The illuminated areas are made by providing apertures in the screen 12 and permitting a source of light to pass through the apertures in the screen. Each of the illuminated areas 14 are of different sizes relative to each other. Each window could have a different amount of illumination intensity. The size of the illuminated areas are such that the smaller area is provided for a slower speed and larger areas are provided for progressively faster speeds. By way of example, the illuminated area 20 could be used for indicating the proper distance at 20 mph; the illuminated area 22 could be utilized to represent the proper distance at 40 mph; and the illuminated areas 24 and 26 would represent the proper distance at 60 mph and 70/80 mph respectively. The illuminated areas 21 and 23 could be provided for insuring a minimum safe stopping distance for urban and rural locations. Also the spacing between successive areas are predetermined such that the spacing increases between the larger sized areas in proportion to their size and for the desired speed. The spacing between the illuminated area can be determined in accordance with the principles of merging as explained in the aforementioned parent application. The combination of the size of the light and the light intensity through each window is set in accordance with the speeds desired to satisfy safety requirements.

Utilizing the embodiment shown in FIG. 3, when a first vehicle approaches the rear of a second vehicle carrying the device shown in FIG. 3, assuming the first vehicle is traveling at a speed of 20 mph, if he is too close to the vehicle carrying the device, then the window 20 will appear clearly distinct and discrete. If he moves back to a safer distance for that speed, then the window 20 will be merged with the windows 21 and 23 since he will no longer be able to detect these windows as discrete windows and on the other hand they will now appear as one larger window. If the vehicle is traveling at 40 mph, and he is too close for that speed, then the illuminated window 22 will be discretely visible. If he is at a safe distance for that speed, then the window 22 will appear to have merged with the previously merged windows 20, 21 and 23 and therefore the illuminated window 22 will no longer be discretely visible at that speed. In a similar manner at 60 mph, if the vehicle is too close, he will be able to discretely identify the window 24. If he is at a safe distance, he will find that the window 24 will have merged with the previously merged windows 20, 21, 23, 22 and 24 and will no longer be distinctly visible. In each of these cases, if the driver cannot clearly discern the particular window associated with the speed at which he is traveling, then he is in an area where caution must be exercised and the vehicle should be slowed down to provide additional spacing or other alternatives available to obtain the necessary or proper spacing required for the indicated speed.

Using the embodiment shown in FIG. 3 the rule is that if the driver of the vehicle viewing the apparatus can distinctly see the particular illuminated window assigned for that speed at which he is traveling, then he is too close for that speed. If he can no longer discretely see the particular illuminated window assigned for that speed, then he is at a safe distance. If he cannot clearly discern whether he sees the discrete window or not then caution is needed.

Figure 4:
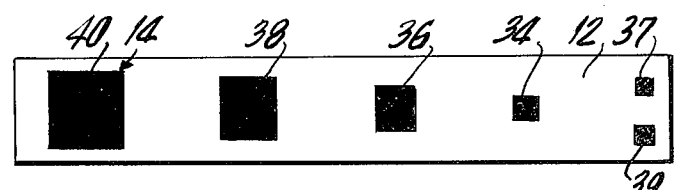
FIGS. 4–10 are various forms of a second embodiment in accordance with the present invention.

Referring now to FIG. 4 a second embodiment of the present invention is shown wherein the screen 12 is an illuminated background and each of the windows 14 are dark areas. Each of the dark areas 14 is of a different size, and each one represents a different speed. Thus, the smallest area 34 can represent a speed of 20 mph; the area 36 is utilized for a speed of 40 mph; the area 38 is utilized for a speed of 60 mph; and the area 40 is utilized for a speed of 70/80 mph. Additional areas 37 and 39 are included to provide minimum safe stopping distances for urban and rural locations. Using the apparatus shown in FIG. 4, when a vehicle is traveling at a speed of 20 mph, if he is too close to the vehicle carrying the device, then he will distinctly be able to see the darkened area 34. If on the other hand he is at a safe distance behind the vehicle for that speed, then the area 34 will tend to disappear and he will no longer be able to distincly recognize this area as it will blend into the background. Similarly, at 40 mph, if he can distinctly detect darkened area 36, he will be too close for that speed. On the other hand, if he is at a safe distance, the area 36 will disappear blending into the background and will no longer be distinctly visible. Similarly, for the other darkened areas at their respective speeds. The rule in utilizing the embodiment shown in FIG. 4, is that if the dark area assigned to a particular speed can be discretely seen at that speed, then the trailing vehicle is too close a distance for the given speed. On the other hand, if the particular darkened area can no longer be discretely seen at that speed, then the trailing vehicle is at a safe distance. If the driver of the trailing vehicle is unsure whether he can distinctly recognize the particular darkened area or not, then he is at a distance which requires caution and he can determine whether he should reduce his speed and fall back; whether he can safely increase his speed and change lanes or other such maneuvers.

Figure 5:
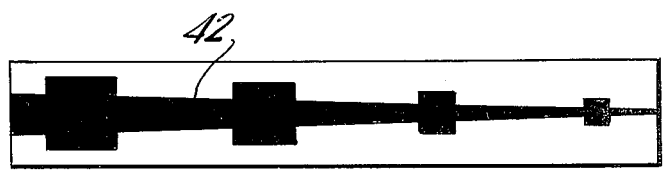

Referring to FIG. 5 there is shown a second version of the embodiment shown in FIG. 4, wherein each of the darkened areas are interconnected by means of an arrow shaped bar 42. The basic principle for utilizing FIG. 5 is essentially the same as FIG. 4 however the arrow shaped bar provides an additional means of identifying where the dark areas are located, making it easier for a driver to determine if he sees the particular darkened area or not. Although the minimum stopping areas for urban and rural locations are not shown in this figure, it is understood that they could be added.

Figure 6:
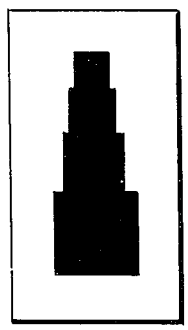
Figure 7:
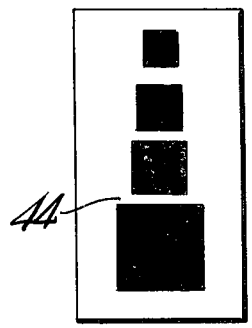

Referring now to FIG. 6, there is shown still a further version of the second embodiment of this invention which comprises a plurality of blocks formed in pyramid fashion. Each of the blocks again represents a warning area for a particular speed. These blocks can be mounted vertically as shown or alternately could be located horizontally. Furthermore, referring now to FIG. 7, the blocks could also be provided with a spacing therebetween 44, to more clearly distinguish between one block and the next block at the different speeds. Stopping area could be added.

Figure 8:
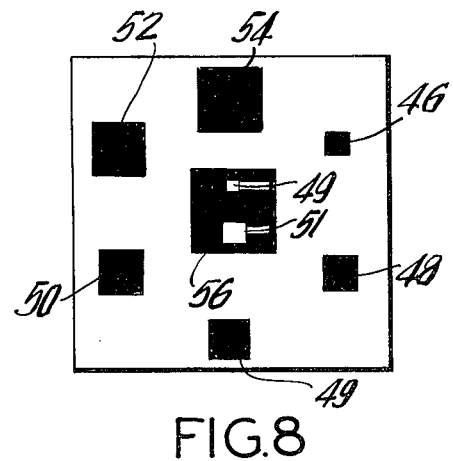

Referring to FIG. 8, there is shown yet another version of the second embodiment wherein the location of the particular blocks is in accordance with the positions of a clock. Thus, the block 46, which represents the warning area at 10 mph, is placed at the 10 minute position of a standard clock. The area 48, representing the warning area for 20 mph, is positioned at the 20 minute place on a clock. Area 49 is positioned at the 30 minute position representing 30 mph. Similarly, area 50 is located at the 40 minute position representing 40 mph, and area 52 is located at the 50 minute position representing 50 mph. Area 54 represents 60 mph and is located at the 60 minute position, and the center area 56 can be utilized for a very high speed warning such as 70/80 mph or higher. Utilizing the positions of a clock, as shown in FIG. 8, it is easy for a driver to recognize which area is the warning area for a particular speed, since he can easily recognize and is easily familiar with the positions on a regular clock. The same principles of utilizing the version as described in connection with FIG. 4 also apply to utilizing the version of FIG. 8.

Figure 8A:
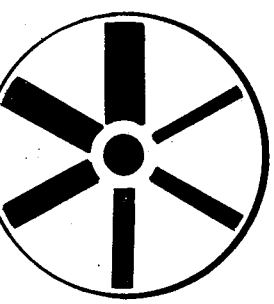

The areas for minimum safe stopping distances for urban and rural locations 49, 51 are shown included within the dark area 56. In this manner it is possible to include the concepts of the first and second embodiments into a single device. The warning areas for the stopped condition are illuminated areas 49, 51 which can be seen against a dark background, i.e. eara 56. At the same time the area 56 itself it utilized as a warning area to determine the proper distance for a different speed. In a similar way it would be possible to include dark warning areas within an illuminated warning area, wherein both areas provide warnings for different speeds. FIG. 8A shows an alternate version wherein radial bars are used to indicate the warning areas. The bars could be the dark areas, or alternately the illuminated areas could be the warning areas.

Figure 9:
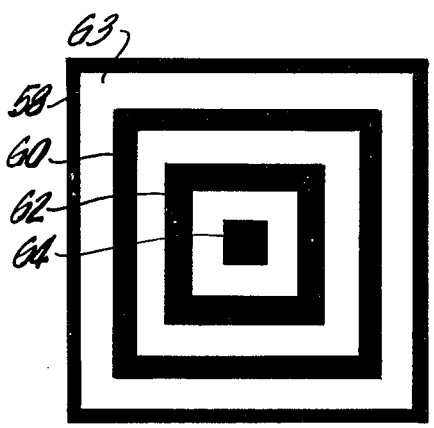

Referring now to FIG. 9 there is shown yet another version of the second embodiment wherein each of the various blocks are shown incorporated one within the other. Furthermore, rather than utilizing a solid block, the dark area can be a frame of the block. The outer frame 58, which is the thinnest area, would be utilized at the slowest speed, as for example 20 mph. The next inward frame 60, being a thicker area would be utilized at a greater speed, as for example 40 mph. Similarly, the frame 62 would be utilized at the next successively higher speed, as for example 60 mph, while the center block 64 which is the largest dark area would therefore be the last to disappear and would be the warning area for 70/80 mph.

It is understood that this system could be reversed such that the area in the center would be the smallest area and would be utilized for the slower speed and the frames around the center block would be increasingly thicker and would therefore represent the warning areas for successively higher speeds. Furthermore, it is possible to use a fixed thickness for the dark area frames, and use progressively larger illuminated area 63 to indicate progressively larger speeds. The size of the illumination areas in conjunction with an appropriate illumination intensity from each area would provide the visual indication at each assigned speed. Also, it is possible to include the minimum safe stopping distances for urban and rural locations by using illuminated windows within the centermost dark area 64. Rather than using a complete rectangular frame, a series of vertical or horizontal bars could also be used.

Figure 10:
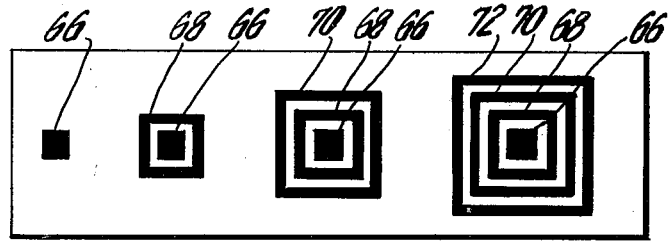

Referring now to FIG. 10, there is yet another version of the second embodiment. In this version, the smallest sized area 66 is a single darkened area which is utilized at the slowest speed. The second area is actually a composit of the first area 66 plus an outer frame 68 such that the total area is larger than the single area 66. Similarly, for the next successive speed, there is provided the first and second areas 66 and 68 with an additional outer frame 70. For the largest total area, there is provided in addition to the areas 66, 68 and 70 an additional outer frame 72. The single area 66, would, by way of example, be utilized to represent the slowest speed such as 10 mph. The next three would be utilized to represent higher speeds such as 20, 30 and 40 mph, respectively. The benefit of utilizing this version is that the viewer is able to easily determine which of the areas he must focus on for the particular speed at which he is driving. He can determine this by merely counting the number of individual areas and correlating that with the speed at which he is traveling. Thus, at 10 mph, a single area is utilized. At 20 mph, two areas are utilized, namely 66 and 68. Similarly at 40 mph there are a total of 4 areas utilized, 66, 68, 70 and 72. In a similar manner, additional areas could be provided for higher speeds. It is understood that the placement of the areas could be reversed and the slowest speed indicator 66 would be at the right and the fastest speed indicator would be at the left.

Figure 11:
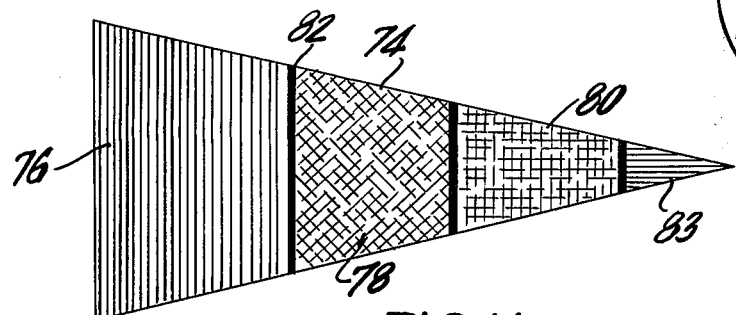
FIGS. 11 and 12 are various forms of a third embodiment in accordance with the present invention.

Referring now to FIG. 11, there is shown a third embodiment of the present invention, wherein, by way of example, the total shape of the apparatus is in the form of a banner or arrow head 74. The device is divided into different areas such that the areas are decreasing along its length. The largest area 76 would be utilized for the fastest speed, the successive areas 78, 80 and 83 would be utilized for successively smaller speeds. Each of the areas could be separated by a darkened bar 82, although this would not necessarily be needed. By utilizing the embodiment of FIG. 11, it is possible to have different colors for each of the areas as well as different amounts of light coming through each area. Thus, by way of example, the area 76 could be a red area, the area 78 an orange area, the area 80 a yellow area, and the area 83 a blue area. Other colors and combinations thereof could easily be substituted. Utilizing the embodiment shown in FIG. 11, if a car is traveling at, for example 20 mph, if he can see the blue area 83, he recognizes that he is too close a distance for that speed. On the other hand if the area 83 disappears and he can no longer see a blue light, then he knows he is at a safe distance for that speed. Similarly, at a speed of 40 mph, if the yellow area 80 is visible the driver knows he is spaced too close at that speed. On the other hand if the yellow area is not visible than he knows he is at a safe speed. The other speeds can work in a similar manner. If the driver is unsure of whether he can see the particular color or not, then he must exercise caution and determine whether he should reduce his speed and fall back, whether he can safely increase his speed and change lanes, or other such maneuvers.

Although the third embodiment has been shown with respect to FIG. 11, it is understood that this embodiment could also be used in connection with each of the other figures. Thus, the clock of FIG. 8 could have different colored areas instead of the dark areas, and similarly each of the dark frames of FIG. 9 could be replaced by different colored areas.

When the areas are mounted on existing lighting systems of vehicles, there may be present separating bars between the tail lights. These bars would not interfere with the system of the present invention and would not confuse the driver of the vehicle since he would focus on the particular warning area and not on the bars or spaces between the existing tail lights.

Figure 12:
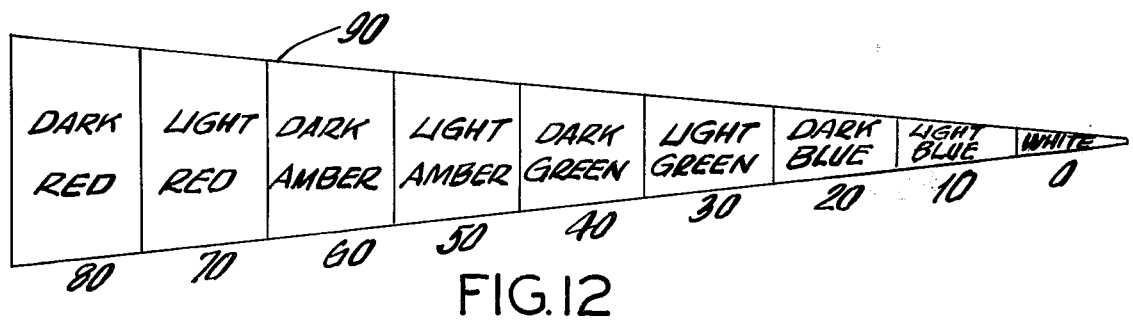

The present invention could be fabricated similar to "bumper stickers" by simply providing adhesive on the dark areas which could stick onto existing tail lights of vehicles, especially if the tail lights are in the form of a horizontal bar. Additionally, the present invention could be fabricated by providing reflective strips and/or prisms which can simply be applied onto any portion of the vehicle and would reflect light from the headlights of a trailing vehicle to provide the proper warnings. Referring to FIG. 12 one such "bumper sticker" arrangement is shown which could be pasted onto the car and provide warnings for speeds from 10 mph to 80 mph, and utilizes an arrow shaped bar 90 having different colored sections for each area assigned to a given speed, as is shown. For the minimum stopping distance, a white area is also included. However, the separate urban and rural minimum stopping warning areas could also be used. The arrangement of FIG. 12 is inexpensive and easy to install and in fact could be used temporarily until a permanent system is installed.

In one particular experiment utilizing the embodiment shown in FIG. 3 of the present invention, the smallest window 20 was ⅜ inch wide; the next window 22 was ½ inch wide; the next window 24 was 6/8 inch wide and the final window 26 was 1 inch wide. The height of all the windows was the same. The spacing 32 was ⅛ inch; the spacing 30 was ¼ inch; and the spacing 28 was 1⅛ inch. In an experiment utilizing the embodiment shown in FIG. 4, the area 40 was 14/16 inches square; the area 38 was 10/16 inches square; the area 36 was 6/16 inches square and the area 34 was 4/16 inches square. It is recognized that these examples were achieved merely by way of experiment, and that other sizes and areas could easily be utilized, as well as other types and shapes of windows or dark areas.

Figure 13:
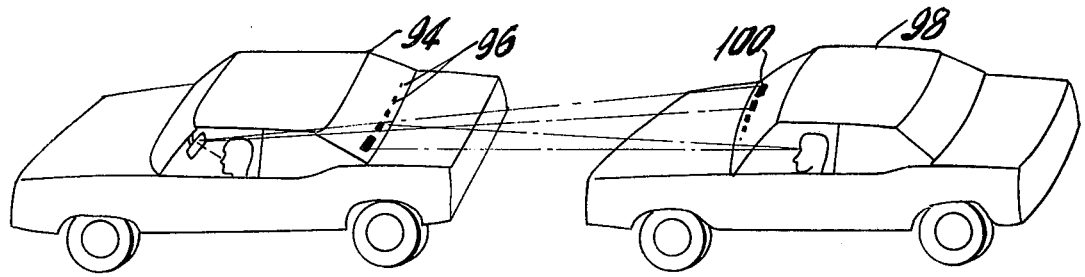
FIG. 13 is a perspective view of this invention as it is used by drivers of vehicles.

Referring now to FIG. 13 it can be seen how the present invention can be used to prevent accidents. The forward vehicle 94 is shown equipped with the device of this invention as part of its rear windshield 96. The trailing vehicle 98 includes the device as part of its front windshield 100. The driver of the forward vehicle can look through his rear view mirror and determine for the speed at which he is traveling, whether there is sufficient distance between his car and the trailing car. Similarly, the driver of the trailing car can look at the device on the forward car and determine for the speed at which he is traveling, if there is sufficient distance between his car and the forward car. Thus, each driver can determine if he is at a safe distance, caution distance or danger distance from cars in front of him as well as cars in back of him, and act accordingly. It is understood that when in use the lights would be on both day and night.

Although FIG. 13 shows the device located with respect to the windshields, it is understood that the device could also be placed elsewhere on the vehicle, e.g. on the upper part of the trunk adjacent the bottom of the windshield, or on the vertical rear portion of the vehicle, or the vertical front portion of the vehicle or on the top or sides of the vehicle, etc. Also, the device could be mounted horizontally or vertically. Furthermore, the areas could be of any shape, including squares, rectangles, circles, etc. Additionally, the illumination intensity of the windows, or the screen background could be controlled so that different intensities are provided for daytime and night time driving. Using known electronic detection circuits, the intensity could also be controlled according to the natural light of the day or night or under fog conditions. The number of areas utilized would depend on the number of speeds which are to be covered. Thus, in the figures there has been provided indications covering speeds from zero to 70/80 mph. However, different speeds could also be covered.

In addition to its use in vehicles, the present invention could find use in airports. The device of the present invention could be located on the ground and pilots landing a plane could judge if there is a proper distance between their plane and the ground, for the speed at which they are traveling. The present invention could also find use in many other situations where a distance indication is needed for a particular speed such as in connection with boats.

There has been disclosed heretofore the best embodiments of the invention presently contemplated. However, it is to be understood that various changes, modifications and improvements may be made hereto without departing from the spirit of the invention.

I claim:

1. A vehicle safety device for providing a visual indication to a driver of one vehicle when the distance between his vehicle and another vehicle is safe, unsafe or where caution is needed, for the speed at which he is driving, said device comprising a plurality of different sized solid geometric warning areas, located with respect to said other vehicle all areas having a similar geometric shape, the areas sequentially positioned to form a total integral pattern in which each area has a particular position, each area being assigned to a particular speed at which an indication is to be provided, and wherein the discrete appearance of an area indicates an unsafe distance at the particular assigned speed, the absence of the discrete appearance of the area indicates a safe distance at the particular speed, and the lack of clear discernment of the area indicates that caution is needed.

2. A device as in claim 1 and further comprising screen means positioned with respect to said other vehicle and wherein said plurality of areas are on said screen means, the light transmissivity properties of said screen means and said areas differing from each other whereby said areas are viewable on either side of said screen means.

3. A device as in claim 2 and wherein said screen means is impervious to light and wherein said areas are windows capable of transmitting light.

4. A device as in claim 2 and wherein said screen means is capable of transmitting light and said areas are opaque.

5. A device as in claim 2 and further comprising housing means positioned on said other vehicle, said screen means supported by said housing means, and illumination means contained in said housing means and positioned on one side of said screen means.

6. A device as in claim 2 and wherein said screen means is a part of the lighting control system of the vehicle.

7. A device as in claim 1 and wherein all of said areas are of the same height, the width of the areas being larger for increased assigned speeds, and wherein the spacing between adjacent areas is increased as the areas increase.

8. A device as in claim 1 and wherein each of said areas is capable of transmitting a different color of light.

9. A device as in claim 1 and wherein said areas are in the form of reflective means.

10. A device as in claim 1 and wherein said areas are located within the windshield of said other vehicle.

11. A device as in claim 10 and further comprising support means positioned adjacent the windshield, said support means having a front portion facing the windshield and remaining portions thereof being impervious to light, and illumination means contained in said support means whereby said illumination means can be viewed through the front portion of said support means and wherein said areas are located on the front portion of said support means.

12. A device as in claim 11 and wherein said support means includes a plurality of housing units each including a separate illumination means whereby each area has its own housing unit.

13. A device as in claim 12 and wherein said illumination means are optoelectric devices.

14. A device as in claim 1 and wherein one of said areas represents a minimum stopping distance for urban areas and another of said areas represents a minimum stopping distance for rural areas.

15. A device as in claim 1 and further including additional warning areas contained within at least one of said different sized warning areas such that said one warning area forms a background for said additional warning areas.

16. A device as in claim 1 and wherein said single integral pattern is in the form of a clock and said areas are located at the minute positions of the clock, the speed assigned to each area corresponding to the minute position at which it is located.

17. A device as in claim 1 and wherein said areas are rectangular frames of different widths and different sizes, the frames being concentrically positioned within each other.

* * * * *